United States Patent [19]

McIntyre

[11] Patent Number: 5,257,706
[45] Date of Patent: Nov. 2, 1993

[54] METHOD OF CLEANING LASER ABLATION DEBRIS

[75] Inventor: Kevin J. McIntyre, Rochester, N.Y.

[73] Assignee: Bausch & Lomb Incorporated, Rochester, N.Y.

[21] Appl. No.: 952,938

[22] Filed: Sep. 29, 1992

[51] Int. Cl.⁵ .............................. B23K 26/00
[52] U.S. Cl. .................. 219/121.69; 219/121.61; 219/121.84
[58] Field of Search ............ 219/121.61, 121.68, 219/121.69, 121.84, 121.74, 121.85; 430/297; 156/643; 264/1.4

[56] References Cited

U.S. PATENT DOCUMENTS

| | | | |
|---|---|---|---|
| 4,307,046 | 12/1981 | Neefe | 264/1.4 |
| 4,417,948 | 11/1983 | Mayne-Banton | 156/643 |
| 4,563,565 | 1/1986 | Kampfer et al. | 219/121.69 |
| 4,568,632 | 2/1986 | Blum | 430/322 |
| 4,713,518 | 12/1987 | Yamazaki et al. | 219/121.69 X |
| 4,752,668 | 6/1988 | Rosenfield et al. | 219/121.68 |
| 5,061,342 | 10/1991 | Jones | 156/643 |
| 5,068,514 | 11/1991 | Lunney | 219/121.69 |

Primary Examiner—C. L. Albritton
Attorney, Agent, or Firm—David M. Krasnow; Denis A. Polyn; Craig E. Larson

[57] ABSTRACT

A method is disclosed for ablating a target surface and cleaning an ablated target surface resulting in the reduction of ablation debris accumulation.

18 Claims, 3 Drawing Sheets

METHOD OF CLEANING LASER ABLATION DEBRIS

BACKGROUND OF THE INVENTION

1. Field of the Invention

The present invention relates to the field of laser etching of target surfaces through ablation and methods for smoothing surfaces using lasers as well as targets modified by such ablative techniques.

2. Background

The use of laser beams to modify surfaces is known. In the early 1980's, it was discovered that pulsed lasers emitting in the ultraviolet frequency range could affect a target surface through ablative photodecomposition (APD). Later it was found that by using APD, layers of target material could be removed on the order of about one micron of target material per laser pulse.

It was further noted that APD did not significantly alter the characteristics of the newly exposed material immediately below the ablated material. This phenomenon has been explained as being due to the UV laser providing enough energy in a short enough period of time to actually break the covalent bonds of the polymeric target materials without heating the substrate. (See U.S. Pat. Nos. 4,417,948 and 4,568,632). Further scanning techniques using APD are disclosed in U.S. Pat. No. 5,061,342.

Certain materials, when ablated, create varying amounts of debris, some of which is redeposited upon the surface of the target material. It is believed that this redeposited debris somehow frustrates efforts to predictably modify the target surface using APD. Further, certain materials can not be as cleanly etched as others. A method for removing the deposited and adhered debris from the target surface while avoiding further debris accumulation is not known.

SUMMARY OF THE INVENTION

A novel method to ablate surfaces in a way that simultaneously clears away deposited debris, and avoids subsequent ablation debris accumulation has now been determined. The debris formed during the ablation process which becomes redeposited at, and adheres to the target surface must be removed from the target surface before the ablation process continues over the remainder of the target surface. In accordance with this invention, a method is disclosed for ablating a target surface comprising a discrete cleaning step designed to remove deposited debris from the target surface.

In one embodiment a method is disclosed for photoablating a target surface and removing debris (or avoiding debris accumulation) comprising exposing said target surface to alternating high and low fluence pulses.

In a further embodiment of the invention, a method is disclosed for ablating a target surface comprising the steps of:

a) directing a beam of pulsed UV radiation at an initial scan area of said target surface; and b) exposing said target surface to intermittent pulses of alternating low and high fluence.

In a further embodiment of the present invention, is disclosed a target surface modified by exposing said surface to intermittent pulses of low and high intensity UV radiation which may be scanned in a direction away from an initial area of said target surface such that said target surface is scanned in a predetermined manner to achieve a predetermined final surface.

It is further thought that the invention of the present application is especially useful for profiling, crosslinked, thermoset, thermoplastic or other materials including optically clear materials such as glass, and materials suitable for use as contact lenses.

DETAILED DESCRIPTION OF THE INVENTION

The present invention relates to a new method of modifying optical surfaces to produce changes in their spherical, cylindrical or other refractive power. This new method may be incorporated into the procedures taught in U.S. Pat. No. 5,061,342 the entire content of which is incorporated by reference herein.

The method of the present invention employs intermittent UV radiation pulses of alternating high and low fluence to ablate material from a surface in order to produce a desired final surface configuration or surface geometry. Suitable surfaces to be ablated include contact lenses, contact lens blanks, molds used to make contact lenses, tools used to make such molds, and any object which either directly or indirectly imparts a desired predictable final spherical, cylindrical or other refractive power, shape factor or other surface geometry to an object, such as a contact lens.

Figure 1:
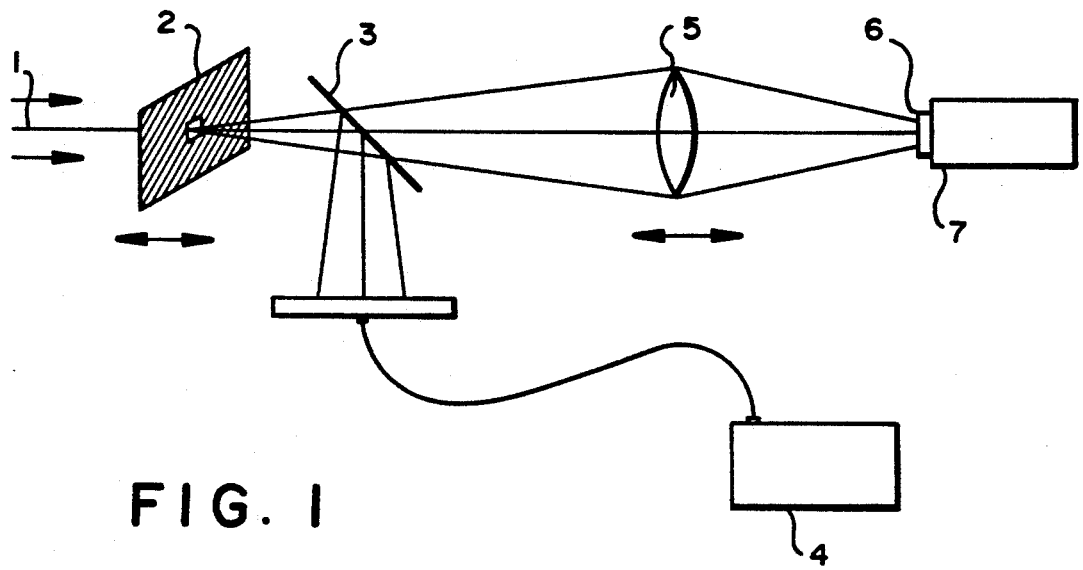
FIG. 1 is a representative view of the laser set-up.
Figure 2:
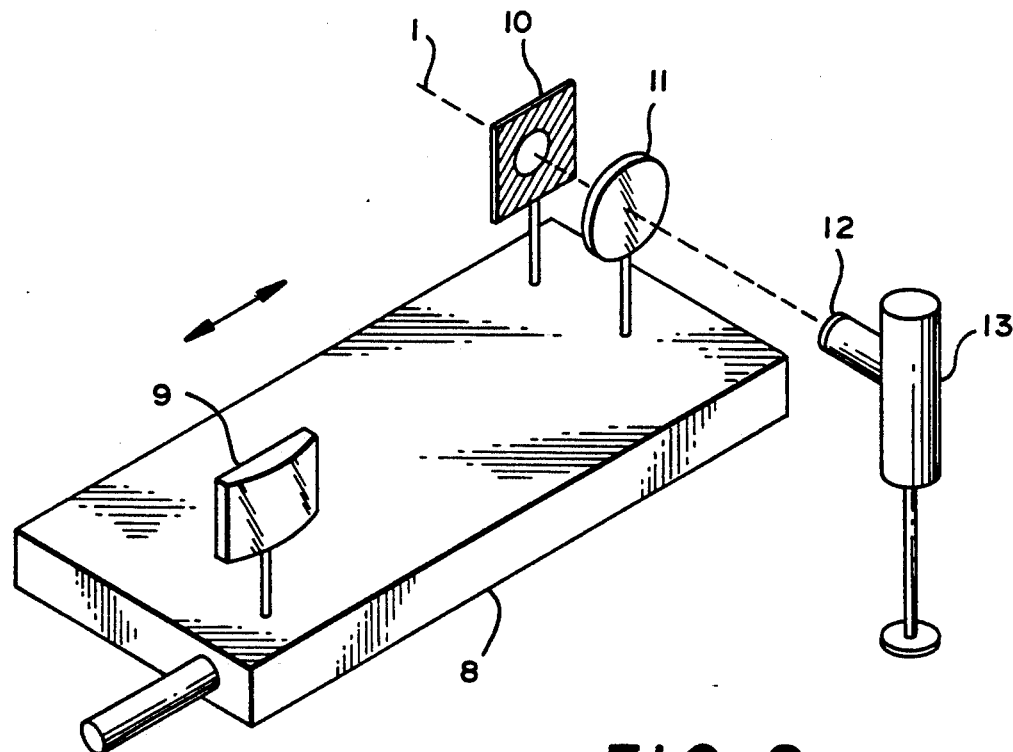
FIG. 2 is a representative view of the focusing lens stage.

Preferred set-ups for the present invention are shown in FIGS. 1 and 2. In FIG. 1, the laser beam (1) is emitted from an excimer laser source (not shown) and directed through a mask (2), before being directed to a beam-splitting apparatus (3) used to monitor the energy output of the beam. A joulemeter (4) receives the reflected energy from the beamsplitter, with the transmitted beam travelling to the imaging lens station (5). The beam is then conditioned for either the high or low fluence pulse by moving the imaging lens station closer to or away from said target (6). The beam then travels to the target or substrate (6) which is held in place by a holding means (7).

FIG. 2 is an exaggerated view of another preferred imaging lens stage (8) which comprises a 300 mm f.1. cylindrical lens (9) (for low fluence pulses), and both a 20 mm circular aperture (10) and a 250 mm f.1. spherical lens (11) used in combination to condition the raw beam (1) to produce high fluence pulses. The beam is then directed to the target substrate (12) held in place by the holding means (13).

The focusing lens stage may then be moved back and forth via any suitable mechanical means (not shown) which may be computer controlled and programmed to respond to the timing of the excimer laser pulsing. In this way alternating pulses of low and high fluence reach the target surface. It is further recognized that certain combinations of high and low pulses, other than exact alternating pulses, may provide the optimal result for certain target surfaces. In other words, a high-low-low or high-high-low-low pulse scheme may, for example, be found to perform better depending upon the characteristics of the target surface.

The laser energy applied to a target per unit area is known as the fluence, which for UV radiation is often expressed in terms of millijoules per square centimeter ($mJ/cm^2$). The fluence range of the laser scanned in accordance with the present invention for the "low" fluence pulse, is preferably from about 20 $mJ/cm^2$ to about 600 $mJ/cm^2$, is more preferably from about 75 $mJ/cm^2$ to about 400 $mJ/cm^2$, and is most preferably about 150 $mJ/cm^2$. The fluence range for the "high" fluence pulse, is preferably from about 400 $mJ/cm^2$ to about 5 $J/cm^2$, is more preferably from about 750 $mJ/cm^2$ to about 2 $J/cm^2$, and is most preferably about 1 $J/cm^2$ In spite of the apparent overlap of fluence values, it is understood that for a given target material, the "high" fluence value will be greater than the "low" fluence value. Therefore, 500 $mJ/cm^2$ can be either the high or low fluence value depending upon the other fluence used.

While the method of the present invention will work at any given energy level it is understood by those skilled in the field that certain materials will require a certain fluence to effectively affect surface characteristics through ablation.

A "crosslinked" polymeric material is understood to describe any polymeric material which has any attachment of at least two polymer chains by bridges comprised of either an element, a group, or a compounds, known as crosslinking agents.

The term "thermoset" refers to a polymeric material which solidifies or "sets" irreversibly when heated. By contrast, a "thermoplastic" material is understood to refer to a polymer which softens when exposed to heat and is able to return to its original condition.

While the present invention is well suited for the modification of contact lenses, the modification of contact lens buttons, blanks and molds, as well as the tools used to make the molds and the contact lenses is also contemplated by the present invention. Indeed any means for imparting optical properties or surface geometries may be modified by the present invention. The surface modification through laser scanning of such tools used to make the molds which, in turn, are used to make the contact lens in a cast molding procedure is further disclosed in concurrently filed and commonly assigned U.S. Patent Applications.

The present invention is further thought to be useful for other laser scanning applications such as corneal sculpting as well as any other procedures where ablation debris has been noted as an obstacle to achieving better target surface quality after scanning.

The following examples serve only to further illustrate aspects of the present invention and should not be construed as limiting the invention.

EXAMPLE 1

Figure 3:
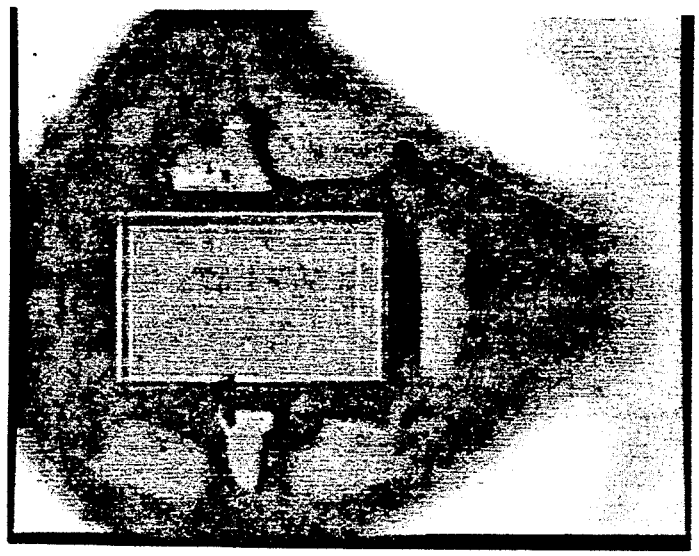
FIG. 3 is a photograph of a hydrogel contact lens material ablated using only high fluence UV radiation pulses.

Comparative Example—Laser Etching of Hydrogel Contact Lens Material in Xerogel State Using High-Fluence As shown in FIG. 1, a laser imaging system consisting of a rectangular aperture (1.818×1.043 mm), a 75 mm focal length movable imaging lens and the contact lens material target was designed and built so that the magnification could be altered between pulses by changing the positions of said aperture and lens. In this example, the imaging lens and aperture were left in the position for producing high fluence of approximately 970 $mJ/cm^2$. The target was exposed to 25 pulses. FIG. 3 is a photograph showing the debris (dark areas) created outside of the etched rectangle.

EXAMPLE 2

Figure 4:
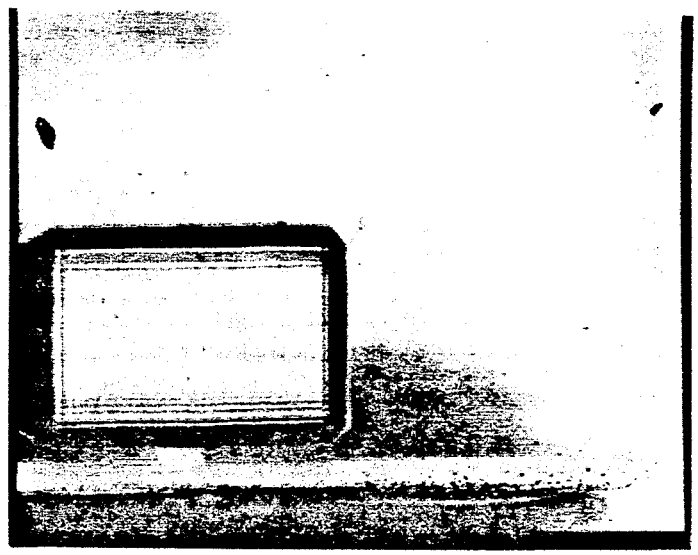
FIG. 4 is a photograph of a hydrogel contact lens material ablated using the alternating high and low fluence UV radiation pulsing technique of the present invention.

Laser Etching of Hydrogel Contact Lens Material in Xerogel State Using High-Low Alternating Pulse Technique A laser imaging system was used as described in Example 1. The imaging lens was moved to two positions between pulses such that two magnifications were produced resulting in fluences of approximately 150 $mJ/cm^2$ and 970 $mJ/cm^2$ at the substrate for the low and high fluence pulses respectively. The target was exposed to 25 pulses each of the high and low fluence pulses in alternating fashion. FIG. 4 is a photograph showing the surface effect from the high-low alternating laser pulse procedure. It can be plainly seen that no debris was accumulated outside the rectangular etch. (See FIG. 3 for comparison).

EXAMPLE 3

Laser Etching of Ultem TM Material in Using High Fluence Pulse Technique

Figure 5:
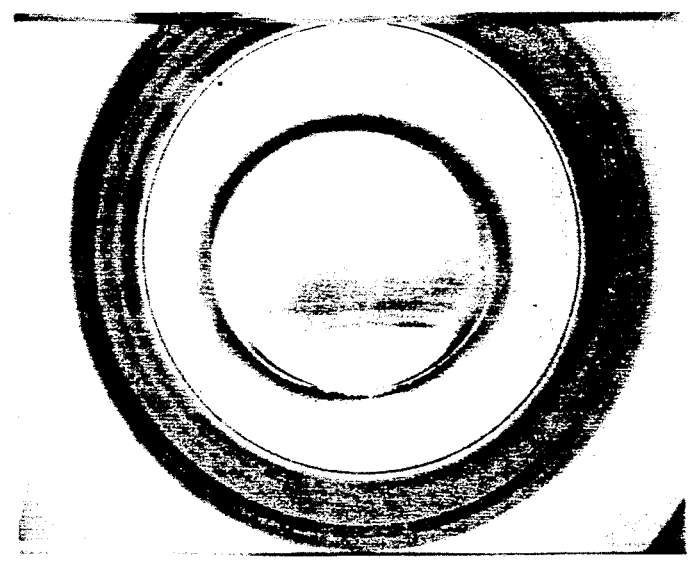
FIG. 5 is a photograph of an Ultem TM workpiece ablated using only high fluence UV radiation pulses.

As shown in FIG. 2, a laser etching system consisting of two alternating beam modification paths was designed. One path consisted of a 20 mm circular aperture, and a 250 mm focal length lens which was used to focus the beam onto the optical zone of the high temperature plastic substrate, Ultem TM (GE, Pittsfield, Mass.), creating a fluence of approximately 1 $J/cm^2$. The other path consisted of a 300 mm focal length cylindrical lens which was used to focus the beam onto an area larger that the optical zone of the target substrate, creating a fluence of approximately 400 $mJ/cm^2$. The system was set up such that the stage could be moved between the alternating pulses. (See FIG. 2). FIG. 5 is a photograph which shows the ringed debris on the Ultem TM surface created by exposing the Ultem surface to only pulses of high fluence (approx. 25 pulses).

EXAMPLE 4

Laser Etching of Ultem TM Material in Using High-Low Fluence Pulse Technique

Figure 6:
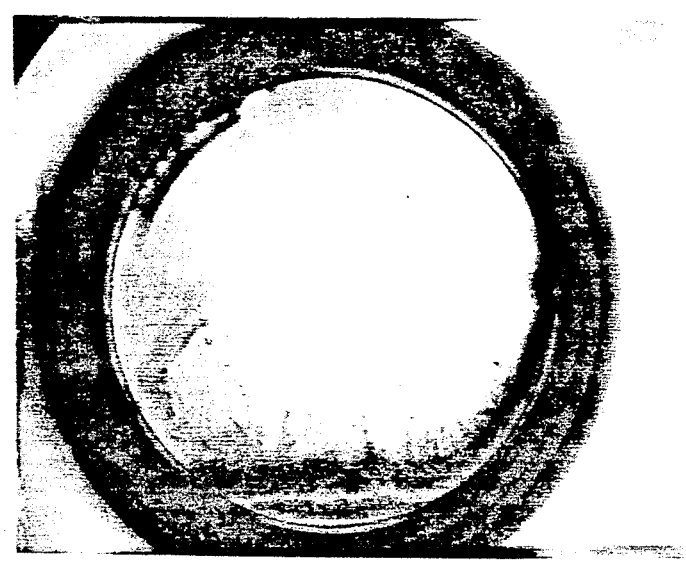
FIG. 6 is a photograph of an Ultem TM workpiece ablated using the alternating high and low fluence UV radiation pulsing technique of the present invention.

The experimental design as described in Example 3 was used. However, an Ultem TM workpiece was exposed to alternating beam pulses of high and low fluence (25 pulses at both high and low fluences). FIG. 6 is a photograph showing that significantly less debris accumulated on the target surface as compared with the results from Example 3 (See FIG. 5).

Many other modifications and variations of the present invention are possible to the skilled practitioner in the field in light of the teachings herein. It is therefore understood that, within the scope of the claims, the present invention can be practiced other than as herein specifically described.

I claim:

1. In a method for photoablating a target surface, the improvement of which comprises exposing said target surface to alternating low fluence pulses of UV radiation.

2. The method of claim 1 wherein said pulsed UV radiation is in the form of a beam emitted from an excimer laser.

3. The method of claim 1 wherein said target surface is comprised of a crosslinked polymeric structure.

4. The method of claim 1 wherein said target surface is a thermoset material.

5. The method of claim 1 wherein said target surface is a thermoplastic material.

6. The method of claim 1 wherein said target is a contact lens.

7. The method of claim 1 wherein the fluence of said low fluence pulse is from about 20 mJ/cm$^2$ to about 600 mJ/cm$^2$.

8. The method of claim 1 wherein said target surface is a means capable of imparting optical properties or surface geometries on at least one other surface.

9. The method of claim 1 wherein the fluence of said high fluence pulse is from about 400 mJ/cm$^2$ to about 5 J/cm$^2$.

10. A method for removing debris from a target surface comprising the steps of:
    a) directing a beam of pulsed UV radiation at a initial scan area of said target surface; and
    b) exposing said target surface to intermittent pulses of alternating high and low fluence.

11. A target surface modified by exposing said surface to intermittent pulses of UV radiation having alternating high and low fluence scanned in a direction away from an initial scan area of said target surface such that the surface of said target surface is scanned in a predetermined manner to achieve a predetermined final surface.

12. The target of claim 11 wherein said target is a crosslinked polymeric material.

13. The target of claim 12 wherein said target is a thermoset plastic material.

14. The target of claim 11 wherein said target is a thermoplastic material.

15. The target surface of claim 11 wherein said target surface is an optically clear substrate.

16. The target of claim 11 wherein said target is a contact lens.

17. The target of claim 11 wherein said target is a toric contact lens.

18. The target surface of claim 11 wherein said target is a means capable of imparting optical properties or surface geometries on at least one other surface.

* * * * *